(12) United States Patent
Musat et al.

(10) Patent No.: US 12,595,953 B2
(45) Date of Patent: Apr. 7, 2026

(54) COOLING DEVICES FOR COOLING PARAFFIN BLOCKS

(71) Applicant: Leavitt Medical, Inc., Lehi, UT (US)

(72) Inventors: Sorin Musat, Bucharest (RO); Lilian Nicolae Nisif, Bucharest (RO)

(73) Assignee: LEAVITT Medical, INC., Lehi, UT (US)

( * ) Notice: Subject to any disclaimer, the term of this patent is extended or adjusted under 35 U.S.C. 154(b) by 302 days.

(21) Appl. No.: 18/196,139

(22) Filed: May 11, 2023

(65) Prior Publication Data

US 2023/0366607 A1 Nov. 16, 2023

Related U.S. Application Data

(60) Provisional application No. 63/341,763, filed on May 13, 2022.

(51) Int. Cl.
| | |
|---|---|
| *F25D 17/06* | (2006.01) |
| *F25D 23/10* | (2006.01) |
| *B33Y 80/00* | (2015.01) |

(52) U.S. Cl.
CPC ............. *F25D 17/06* (2013.01); *F25D 23/10* (2013.01); *B33Y 80/00* (2014.12); *F25D 2201/10* (2013.01)

(58) Field of Classification Search
CPC ..... F28F 3/12; F28F 2270/00; F25D 2400/08; F25D 31/001; F25D 2201/10; F25D 23/10; F25D 17/06; F25B 21/02; F25B 2321/02; G01N 1/42; G01N 1/36; B33Y 80/00

See application file for complete search history.

(56) References Cited

U.S. PATENT DOCUMENTS

| | | | | |
|---|---|---|---|---|
| 3,308,635 A | * | 3/1967 | Tenniswood | .......... F25D 23/006 |
| | | | | 62/277 |
| 3,922,879 A | * | 12/1975 | Arnold | ...................... F25D 3/00 |
| | | | | 62/529 |
| 4,823,554 A | * | 4/1989 | Trachtenberg | .......... F25D 15/00 |
| | | | | 62/3.61 |

FOREIGN PATENT DOCUMENTS

| | | | | |
|---|---|---|---|---|
| DE | 3600668 A1 | * | 7/1987 | ................ B01L 7/00 |

OTHER PUBLICATIONS

English language translation of Weinkauf. Translated Aug. 2025. (Year: 1987).*

* cited by examiner

*Primary Examiner* — Cassey D Bauer
(74) *Attorney, Agent, or Firm* — Greenberg Traurig, LLP

(57) ABSTRACT

A cooling device suitable for cooling paraffin tissue blocks with little or no moisture artefacts, as well as the use thereof to obtain good quality serial sections for microscope slides. The slides can be used in histology and anatomical pathology, for example. The cooling device may include a cold plate, a lid, and a sheet of insulating material over the cold plate.

15 Claims, 5 Drawing Sheets

100

100

| Organ | Cooling Device | Cooling 2 h 30 m | | After 22 days of drying | |
|---|---|---|---|---|---|
| | | Sections (µm) | Average | Sections (µm) | Average |
| Kidney | Cold Plate | 185 | | 180 | |
| Kidney | Cold Plate | 100 | | 200 | |
| Kidney | Cold Plate | 125 | 137 | 150 | 177 |
| Kidney | Embedder | 205 | | 175 | |
| Kidney | Embedder | 200 | | 185 | |
| Kidney | Embedder | 215 | 207 | 195 | 185 |
| Kidney | Ice | 300 | | 260 | |
| Kidney | Ice | 305 | | 265 | |
| Kidney | Ice | 325 | 310 | 260 | 262 |
| Kidney | RT | 135 | 135 | 220 | 220 |
| Kidney, Liver, and Myocardium | Cold Plate | 135 | | 165 | |
| Kidney, Liver, and Myocardium | Cold Plate | 135 | | 195 | |
| Kidney, Liver, and Myocardium | Cold Plate | 100 | 123 | 175 | 178 |
| Kidney, Liver, and Myocardium | Embedder | 135 | | 210 | |
| Kidney, Liver, and Myocardium | Embedder | 115 | | 235 | |
| Kidney, Liver, and Myocardium | Embedder | 100 | 117 | 160 | 202 |
| Kidney, Liver, and Myocardium | Ice | 180 | | 255 | |
| Kidney, Liver, and Myocardium | Ice | 165 | | 250 | |
| Kidney, Liver, and Myocardium | Ice | 165 | 170 | 250 | 252 |
| Kidney, Liver, and Myocardium | RT | 105 | 105 | 220 | 220 |

COOLING DEVICES FOR COOLING PARAFFIN BLOCKS

CROSS REFERENCE TO RELATED APPLICATION

This application claims the benefit of U.S. Provisional Patent Application Ser. No. 63/341,763, filed 13 May 2022, the entire disclosure of which is incorporated herein by reference.

BRIEF DESCRIPTION OF THE DRAWINGS

The accompanying drawings illustrates a number of example embodiments and are a part of the specification. Together with the following description, these drawings demonstrates and explain various principles of the instant disclosure.

FIG. 5 is a chart showing experimental data comparing the use of cooling devices of the present disclosure with the use of other cooling devices and processes.

Figure 1:
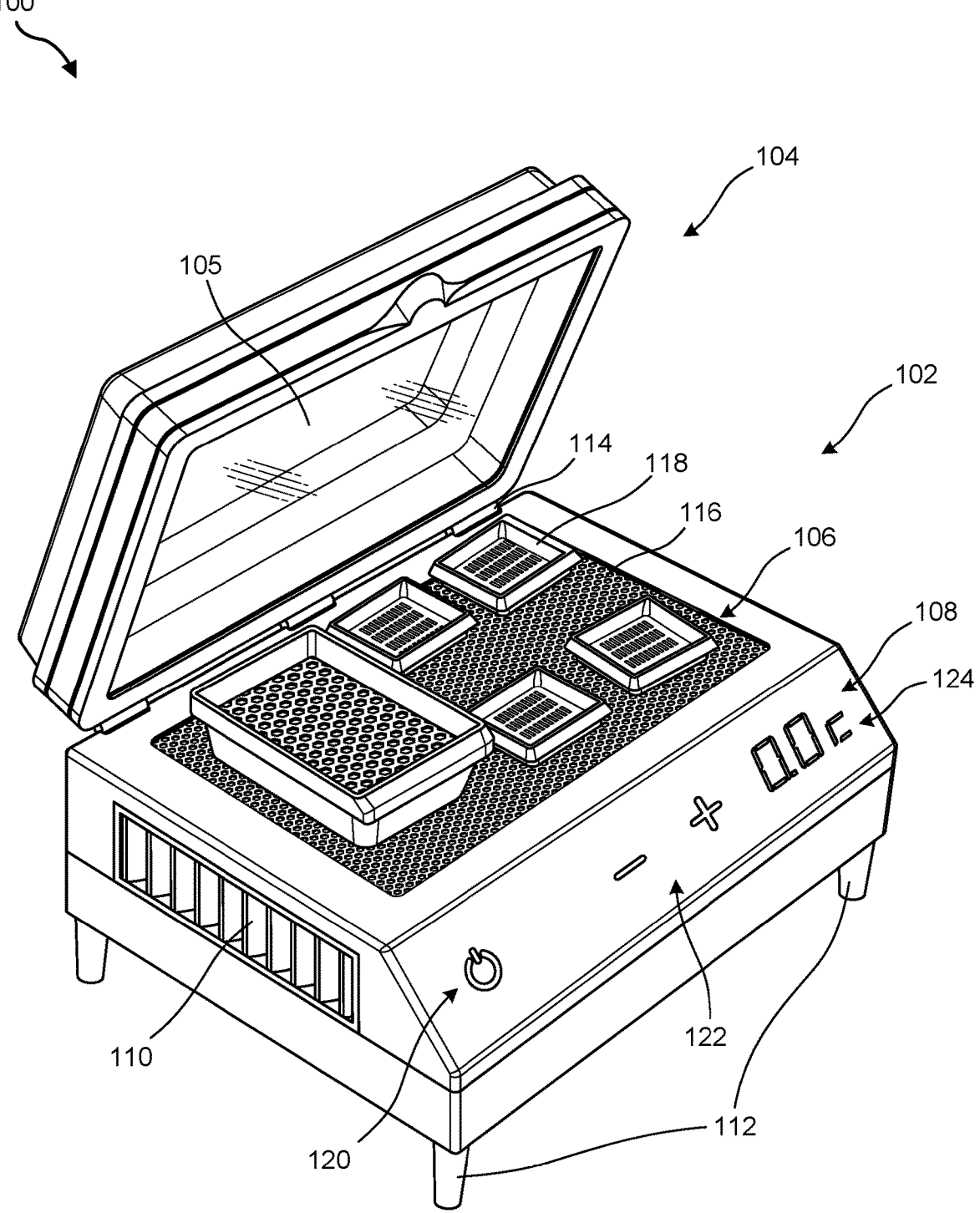
FIG. 1 is a top perspective view of a cooling device, according to at least one embodiment of the present disclosure.

While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The following detailed description relates to at least one embodiment of the present disclosure. The description is not to be taken in a limiting sense but is made merely for the purpose of illustrating the general principles of the disclosure, since the scope of the invention is best defined by the appended claims.

Tissue samples may result from a needle biopsy (sometimes referred to as a tru-cut biopsy), fine needle aspirate, or an explant. The explant and/or biopsy sample for histology purposes may be subjected to specific treatments for making it amenable to microscopic examination, such as fixation, dehydration with ethyl alcohol of increasing concentrations, ethanol removal with a hydrocarbon solvent, and infiltration of the tissue with molten paraffin. The tissue infiltrated with paraffin may then be cast into a paraffin block. As the paraffin block cools, it will solidify and can be sectioned very thinly (2-10 μm) with a sharp steel blade using a dedicated device called a microtome (e.g., a rotary microtome or a sledge microtome). The resulting sections are spread and flattened often using warm water for removing the eventual folds and creases. The sections are then placed on a glass microscope slide, dried, and stained as needed by various methods (e.g., topographical, histochemical, histoenzymological, immunohistological, or molecular) and examined by a pathologist for the eventual diagnostic of a disease.

Histology paraffins presently used can have a melting temperature anywhere between 42 to 52 degrees Celsius (so-called "soft paraffins"), 52 to 58 degrees Celsius (so-called "regular paraffins") and 60 to 68 degrees Celsius or more (so-called "hard paraffins"). For good block sectioning, the hardness of the paraffin should be as close as possible to the hardness of the tissue within the block. Soft paraffins are mainly used for infiltration only (e.g., not for preparing paraffin blocks in which case a harder paraffin is employed), while hard paraffins are usually reserved for dense, hard tissues (e.g., bone, cartilage, etc.). However, most histology laboratories routinely use paraffins with a melting temperature of 56-58 degrees Celsius (so-called "universal paraffin") for both infiltration and paraffin block casting.

Sectioning paraffin blocks is done by skilled histotechnologists who are trained to generate intact, serial sections (ribbons) from the paraffin block, representative of the tissue within.

For efficient microtome sectioning, the paraffin block to be sliced should be of good quality (e.g., devoid of residual water, thorough infiltration of the tissue samples with paraffin, lack of air bubbles or cracks, etc.) and within a proper temperature range for the type of paraffin used. For most paraffins typically used in the histology laboratory, the optimal sectioning temperature lies between 5 and 15 degrees Celsius.

If the paraffin block is too warm at sectioning, the tissue section might stick to the blade and obtaining a ribbon of complete sections may become impossible. If the paraffin block is too cold, the resulting sections will curl and may not generate ribbons. Uncurling the sections is impractical at best. In this case, the operator may attempt to re-warm up the paraffin block until it will reach a temperature suitable for obtaining serial sections in ribbon format. This leads to wasted time and the loss of valuable, sometimes irreplaceable, diagnostic tissue.

For cooling the paraffin blocks to the appropriate temperature for sectioning, some laboratories store the paraffin blocks in a freezer prior to sectioning. Alternatively, some use cold plates. Cooling systems may be active or passive. Active cooling systems include evaporative coolers (e.g., swamp coolers), mechanical-compression refrigeration systems, and/or absorption or thermoelectric coolers. Passive cooling systems may include pre-cooled phase-change materials tuned to the desired temperature. The cooling systems can be provided with adjustable temperature controllers or may have a pre-set cold temperature. Alternatively, some technicians and laboratories may use ice cubes for direct contact cooling. Other technicians and laboratories may store the paraffin blocks on top of trays holding frozen water.

Overcooling the paraffin block by forgetting the blocks in the freezer or using cooling systems set at very low temperatures is a common practice in the belief that this will speed up cooling of an inherently low thermally conductive substance (e.g., paraffin). This overcooling runs the risk of generating fissures in the block and creating artifacts in the resulting sections.

It is also common practice in many laboratories to "soak" or "soften" the paraffin block (after exposing the tissue sample by removing with the microtome the first few layers of paraffin) in cold water or in a proprietary softening solution for improving/speeding up microtome sectioning.

Such softening may be performed for dense tissues (e.g., muscle, tendon, cartilage, etc.) and/or inadequately processed specimens (e.g., incompletely dehydrated and/or incompletely infiltrated with paraffin). While this might marginally improve the sectionability of the paraffin blocks, one runs the risk of overhydrating the tissue within the paraffin block. As a result, the tissue within the paraffin block will swell and additional tissue will often have to be removed and lost before a complete or quasi-complete section is produced. Even if the paraffin blocks are not soaked/softened on purpose, keeping them face-down in direct contact with the surface of the cold plate or of the tray with frozen water may result in moisture being absorbed by the tissue sample, with ruinous results. Moreover, after the absorbed water evaporates from the tissue sample within the paraffin block, the cut surface may present depressions, making the process of recutting new sections problematic and with additional loss of valuable diagnostic material.

Taking into account the shortcomings of the techniques and devices used at the present time for cooling the paraffin blocks a simpler, safer and ideally standardized methods of cooling and sectioning paraffin blocks are disclosed herein.

In some embodiments, a cooling device may be self-limited to around 0 degrees Celsius. This can be achieved by using cooling systems that are active or passive. As noted above, active cooling systems include evaporative coolers (e.g., swamp coolers), mechanical-compression refrigeration systems, and/or absorption or thermoelectric coolers. Passive cooling systems may include pre-cooled phase-change materials tuned to the desired temperature.

For reducing the risk of moisture condensation on the cold plate of the device, a low profile, moveable lid may be attached (e.g., with a hinge, using magnets, etc.) and maintained closed during use, except when placing or removing the paraffin blocks. Further, a thin (e.g., 100-200 μm), perforated (mesh-like) sheet of insulating material (e.g., a polymer material) may be placed on the surface of the cold plate prior to positioning one or more paraffin blocks in the cooling device. The paraffin block(s) may be positioned face-down on the perforated sheet of insulating material.

The perforated sheet of insulating material may inhibit the freezing of the paraffin block(s) to the cold plate and may enable the paraffin block(s) to cool to a temperature above the temperature of the cold plate surface. For example, because of the small volume of air within the enclosure (e.g., between the lid and the cold plate) of the device, the paraffin blocks may cool relatively quickly and then stabilize to a temperature in a desired range for microtome sectioning (e.g., 3-4 degrees above the temperature of the cold plate). Additionally, even if water or ice condensation takes place on the surface of the cold plate, the perforated sheet may prevent soaking of moisture within the paraffin block/tissue sample, thereby avoiding swelling and resulting artifacts during sectioning.

In addition, the lid may be configured to keep out moisture (e.g., from humid air) from the enclosure, reducing or eliminating the buildup of condensation and/or frost on the paraffin block and/or on the cold plate. Even when the paraffin blocks are left in place for many hours, no or very little moisture will be absorbed by the tissue embedded into the paraffin blocks. The perforated sheet of insulating material may also reduce a risk of overcooling the paraffin blocks. Even if a paraffin block is left for an extended time in the cooling device, sectioning may be able to proceed immediately without the need of controlled re-warming.

Figure 2:
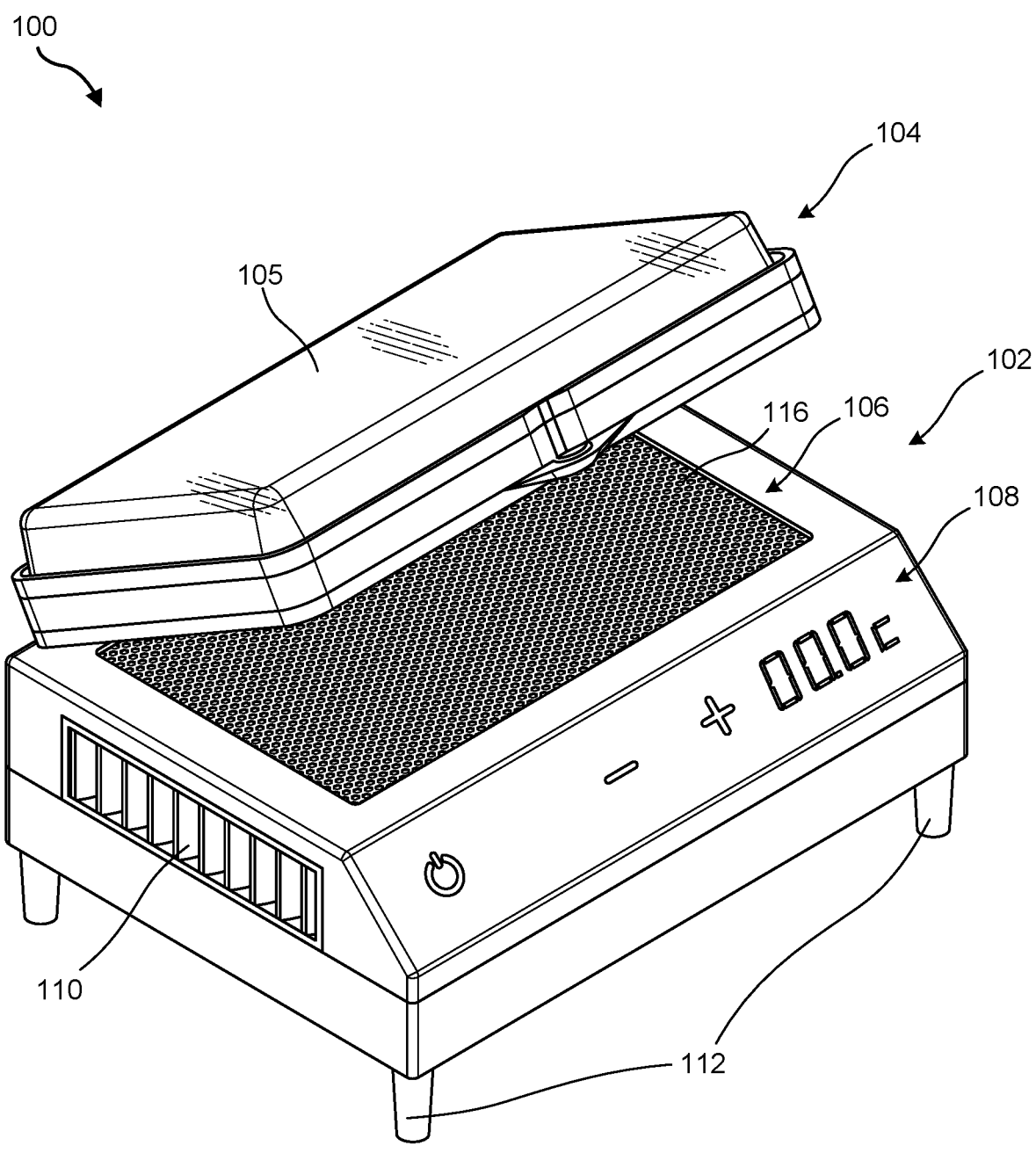
FIG. 2 is another top perspective view of the cooling device of FIG. 1.
Figure 3:
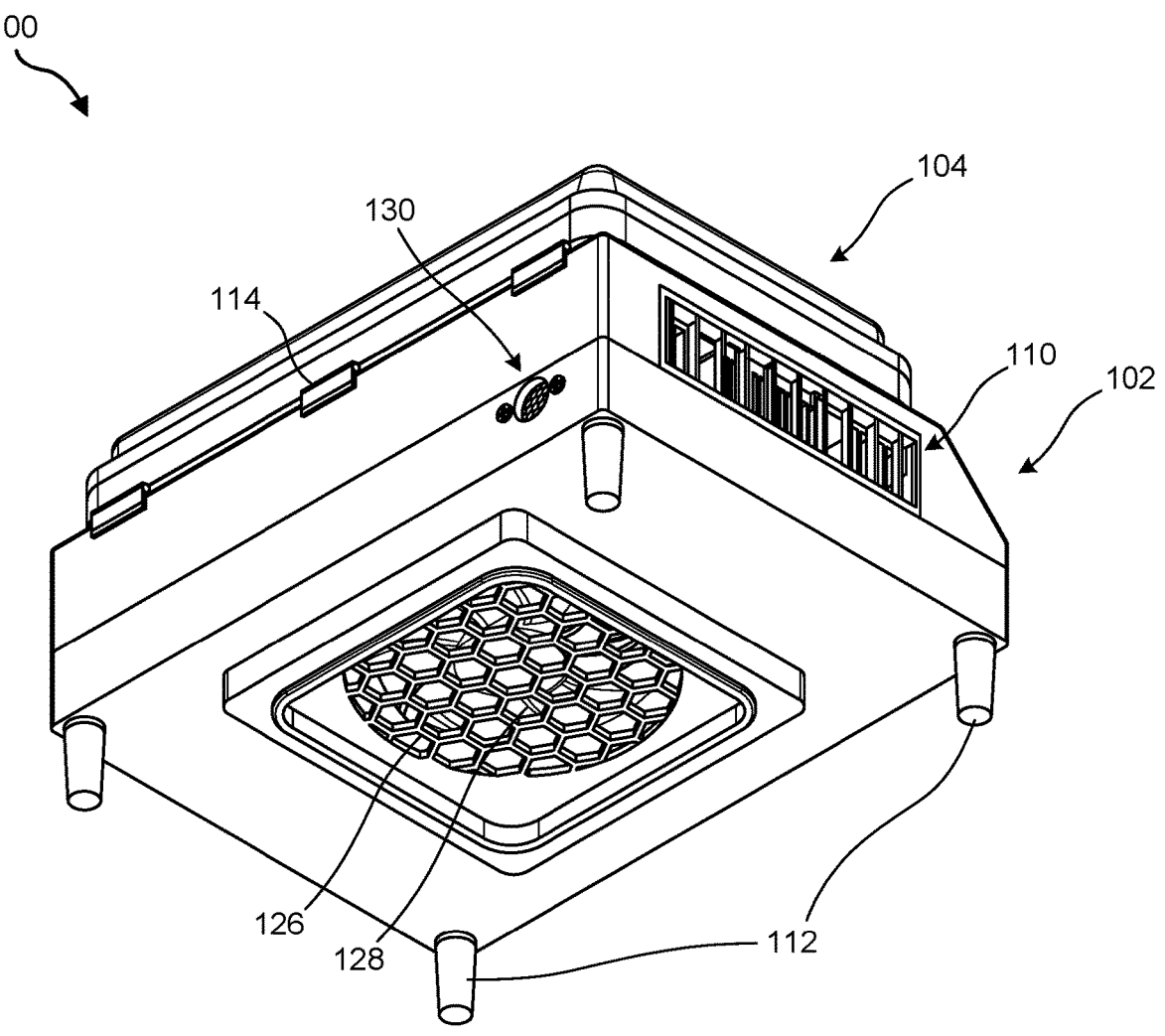
FIG. 3 is a bottom perspective view of the cooling device of FIG. 1.

With reference to FIGS. 1-3, the following will describe an example cooling device of the present disclosure. Then, an example sheet of insulating material according to the present disclosure will be described in relation to FIG. 4. Experimental data comparing the use of cooling devices of the present disclosure with the use of other cooling devices and processes will then be described with reference to FIG. 5.

FIG. 1 is a top perspective view of a cooling device 100, according to at least one embodiment of the present disclosure. FIG. 2 is another top perspective view of the cooling device 100 of FIG. 1. The cooling device 100 may include a base structure 102 and a lid 104. The base structure 102 may include a cold plate 106 and other features and components for physically and functionally supporting the cold plate 106. For example, the base structure 102 may include a user interface 108, a lateral vent 110, and support legs 112. The lid 104 may be rotatably coupled to the base structure 102, such as by hinges 114. A sheet of insulating material 116 (also referred to herein as "sheet 116" for simplicity) may be positioned over the cold plate 106.

The cold plate 106 may be configured for cooling paraffin blocks 118 that include embedded tissue samples, such as for microtome sectioning. For example, the cold plate 106 may be capable of maintaining a predetermined surface temperature, such as −5 degrees Celsius to 10 degrees Celsius. The cold plate 106 may be operated with a mechanical-compression refrigeration device, which may include a fluid circuit containing a coolant, a compressor, a radiator, an orifice for expanding the coolant, etc. In additional embodiments, the cold plate 106 may be operated with a thermoelectric refrigeration device, which may include a junction of two conductors. When current flows through the junction, one of the two conductors may be cooled and the other of the two conductors may be heated.

The lid 104 may be shaped and sized for closing to form an enclosure over the cold plate 106. The enclosure may have a sufficient size for covering one or more paraffin blocks 118 positioned on the cold plate 106. In some examples, the lid 104 may be configured to form a seal around the cold plate 106, such as to control humidity within the enclosure formed by the closed lid 104. The lid 104 may include a transparent window 105, such as for viewing an interior of the enclosure when the lid 104 is closed and to determine whether any paraffin blocks 118 are within the cooling device 100. The hinges 114 may be configured to allow the lid 104 to be positioned in a fully opened position (e.g., the position shown in FIG. 1) and in a closed position. In some examples, the hinges 114 may also be configured to hold the lid 104 in an intermediate position (e.g., the position shown in FIG. 2), such as to reduce a loss of cold air from over the cold plate 106 when paraffin blocks 118 are added to or removed from the cooling device 100.

The sheet 116 may serve as a thermally insulating barrier and/or a moisture barrier between an upper surface of the cold plate 106 and the paraffin blocks 118 resting over the cold plate 106. The sheet 116 may inhibit over-cooling of the paraffin blocks 118, which may facilitate microtome sectioning of the cooled paraffin blocks 118. For example, when the cold plate 106 has a surface temperature of −5 degrees Celsius to 10 degrees Celsius, the paraffin blocks 118 may, after a sufficient time resting on the sheet 116, reach and maintain a temperature of about 5 degrees Celsius to about 15 degrees Celsius. In addition, physically separating the paraffin blocks 118 from the cold plate 106 by the sheet 116 may reduce a likelihood that paraffin blocks 118 freeze to the cold plate 106.

For purposes of describing and defining the present disclosure, it is noted that relative terms, such as "about" and the like, may be utilized herein to represent an inherent degree of uncertainty that may be attributed to any quantitative comparison, value, measurement, or other representation. Such terms can also be utilized herein to represent the degree by which a quantitative representation may vary from a stated reference without resulting in a change in the basic function of the subject matter at issue.

The user interface 108 may include indicators and controls for operating the cooling device 100, including the cold plate 106. For example, the user interface 108 may include a power button and/or indicator 120, a temperature control 122 (e.g., for raising and/or lowering a temperature setting of the cold plate 106), and a temperature indicator display 124. The temperature indicator display 124 may be configured for indicating a current actual temperature of the cold plate 106 and/or a temperature setting of the cold plate 106.

The lateral vent 110 may facilitate airflow through the cooling device 100, such as to improve an efficiency of the refrigeration device that operates the cold plate 106. For example, during operation, air may flow (e.g., from a fan inside the base structure 102) through the lateral vent 110 and across a heat sink (e.g., radiator, heated conductor, etc.) of the refrigeration device to withdraw heat from coolant passing through the refrigeration device.

FIG. 3 is a bottom perspective view of the cooling device 100 of FIG. 1. As shown in FIG. 3, the base structure 102 may also include a lower vent 126 in a bottom surface of the base structure 102. The lower vent 126, in combination with the lateral vent 110, may also facilitate airflow through the cooling device 100. The support legs 112 may extend from a bottom of the base structure 102. The support legs 112 may enable use of the cooling device 100 on a tabletop or other similar surface while providing a space for air to flow into or out of the lower vent 126. In some examples, a fan 128 housed in the base structure 102 may be operable to force air into the base structure 102 through the lower vent 126 and out of the base structure 102 through the lateral vent 110. In additional examples, the fan 128 in the base structure 102 may be operable to induce airflow into the base structure 102 through the lateral vent 110 and out of the base structure 102 through the lower vent 126.

In some examples, the base structure 102 may also include a power supply and associated power supply input 130 (e.g., with a corresponding power cord) for powering the cold plate 106, user interface 108, and fan 128. In additional examples, the power supply may include an internal battery, which may be rechargeable and/or replaceable. In further examples, the cooling device 100 may be powered by a combination of a battery and a corded power supply input 130.

The cooling device 100 of the present disclosure may be capable of implementation in a small, portable form factor that can be useful for a variety of situations in a histopathology laboratory. In addition, the cooling device 100 may be fabricated at a lower cost than other cooling devices that may be larger and/or more complex. Moreover, the cooling device 100 may be capable of more easily maintaining the paraffin blocks 118 at a desired temperature and of reducing humidity and, therefore, resulting condensation buildup on the cold plate 106 and/or on the paraffin blocks 118.

Although the cooling device 100 has been described in the context of use for cooling paraffin blocks in a histopathology laboratory, the present disclosure is not so limited. In additional examples, the cooling device 100 may be useful for many other applications, such as any applications that may benefit from controlling (e.g., reducing) temperature of any object or material that can fit within the enclosure formed by the closed lid 104.

Figure 4:
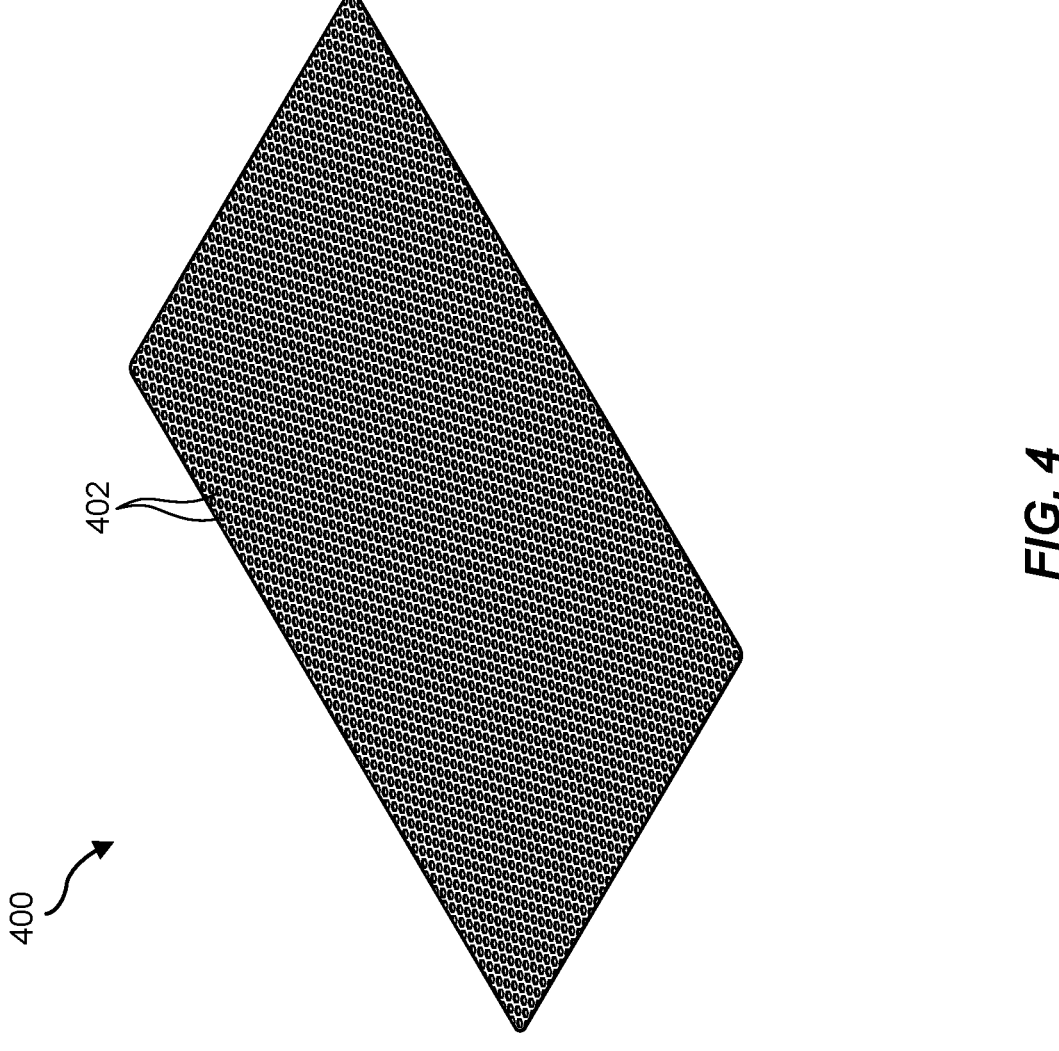
FIG. 4 is a perspective view of a sheet of insulating material, according to at least one embodiment of the present disclosure.

FIG. 4 is a perspective view of a sheet of insulating material 400 (also referred to herein as "sheet 400" for simplicity), according to at least one embodiment of the present disclosure. The sheet 400 may be used as the sheet 116 in the cooling device 100 described above, such as to provide an insulating layer between the cold plate 106 and the objects or materials to be cooled (e.g., the paraffin blocks 118).

The sheet 400 may be formed of a thermally insulating material, such as a polymer material, a fabric material, a fiber-matrix composite material, or the like. For example, the sheet 400 may be formed of a thermoplastic polymer material, such as acrylonitrile butadiene styrene (ABS), polylactic acid (PLA), polyethylene terephthalate glycol (PETG), etc. The sheet 400 may be formed of a thermoplastic polymer material by any suitable manufacturing process, such as three-dimensional (3D) printing, molding, stamping, or machining. In additional examples, a fabric sheet 400 may be formed by any suitable manufacturing process, such as by weaving, braiding, knitting, felting, or the like. In some embodiments, the sheet 400 may include perforations 402 (e.g., holes and/or gaps) to allow air to pass through the sheet 400.

The sheet 400 may be formed to a size that fits over at least a portion of the cold plate 106. For example, the sheet 400 may have a width and a length that is slightly less than a corresponding width and length of the cold plate 106. The sheet 400 may have a thickness that enables heat transfer from the paraffin blocks 118 to the cold plate 106. The sheet 400 may also separate the paraffin blocks 118 from condensed moisture that may accumulate on the cold plate 106. For example, the sheet 400 may have a thickness between about 0.1 mm and about 5 mm, such as 0.1 mm, 0.2 mm, 1 mm, 2 mm, etc.

The perforations 402 in the sheet 400 may facilitate heat transfer between the paraffin blocks 118 and the cold plate 106. In addition, the perforations 402 may reduce an area of contact between the paraffin blocks 118 and the cold plate 106, which may inhibit sticking (e.g., freezing) of the paraffin blocks 118 to the sheet 400. As illustrated in FIG. 4, the perforations 402 may have a hexagonal shape. However, the present disclosure is not limited to hexagonal perforations 402. In additional examples, the perforations 402 may be circular, rectangular, pentagonal, octagonal, or any other suitable shape.

In some embodiments, the sheet 400 may be separate from the cold plate 106 and base structure 102. Thus, the sheet 400 may be removable and replaceable, such as to replace a broken or dirty sheet 400.

Referring to the FIG. 5, multiplexed kidney cores (six per block, using a sectionable matrix material), as well as multi-tissue (e.g., 3 different pig tissues: liver, kidney, and myocardium without any sectionable matrix) blocks were prepared. Tissue processing and paraffin infiltration and embedding were performed. All samples were in triplicate.

The paraffin blocks were faced by microtome sectioning until a complete section could be obtained and the tissue sample within the block was fully exposed. The paraffin blocks were left to equilibrate their temperatures for two hours and thirty minutes either at room temperature ("RT") or using three different methods of cooling. In a first method, the cooling was performed on the cooling plate described herein. In a second method, the cooling was performed on a conventional cooling plate (sometimes referred to as an "embedder"). In a third method, the cooling was performed on an ice tray containing frozen water.

After equilibration, the paraffin blocks were sectioned at a thickness of 5 microns per section with a conventional rotary microtome.

The amount (expressed in microns) of paraffinated tissue discarded that had to be removed before a complete, representative paraffin section was generated (e.g., of acceptable quality for making a diagnostic-quality microscope slide) was recorded. However, when sectioning at RT, even if the sections seemed to be complete, no microscope slide could be generated because of folds in the paraffin section.

The sectioned paraffin blocks were left to dry at RT for 22 days. The blocks were then recut without any additional cooling. The amount of tissue that had to be removed before obtaining another complete section was recorded (in microns). However, even if the sections seemed complete, for all experimental groups, no microscope slide could be generated because of the folds in the paraffin section.

The table 500 of FIG. 5 lists the amount of tissue that had to be removed before obtaining a complete section for the various methods and samples. As can be seen in the table 500, the highest amount of tissue loss after cooling and after drying resulted from using ice as a cooling aid. The second-highest amount of tissue loss resulted from cooling with an embedder and drying. Compared to the other cooling techniques, the disclosed cold plate resulted in the smallest amount of tissue loss after cooling and drying. Immediately after cooling for two hours and thirty minutes, the conventional cold plate and the cold plate according to the present disclosure performed similarly for the paraffin blocks that included kidney, liver, and myocardium tissue samples. However, the paraffin blocks that were initially cooled by the cold plate of the present disclosure performed better after the paraffin blocks were dried for 22 days. Similarly, while sectioning at RT resulted in an initially small loss of tissue, after drying the results were not as favorable as with the disclosed cold plate. The reduction in performance after drying for the conventional cold plate and RT cooling may result from initial absorption of moisture by tissues in the paraffin block, which may cause the tissue to cave as the tissues dry. This caving of the tissue may require removal of more material from the paraffin blocks after drying.

Accordingly, embodiments of the disclosed systems and devices may improve paraffin tissue block sectioning and preservation, resulting in lower potential tissue loss when obtaining high quality sections from the blocks.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A cooling device for cooling paraffin blocks, the cooling device comprising:
   a cold plate configured to maintain a predetermined surface temperature;
   a lid shaped and sized to cover the cold plate and to define an enclosure between the lid and the cold plate when the lid is closed; and
   a perforated sheet of insulating material positioned over a surface of the cold plate to be directly between any paraffin blocks to be cooled and the surface of the cooling plate.

2. The cooling device of claim 1, wherein the perforated sheet of insulating material comprises a perforated sheet of a thermoplastic polymer material.

3. The cooling device of claim 1, wherein the perforated sheet of insulating material has a thickness of 0.2 mm or less.

4. The cooling device of claim 1, wherein the cold plate is configured to maintain a surface temperature of between about −5 degrees Celsius and about 10 degrees Celsius.

5. The cooling device of claim 1, wherein the perforated sheet of insulating material comprises a polymer material.

6. The cooling device of claim 1, wherein the lid comprises a transparent window.

7. The cooling device of claim 1, wherein the cold plate comprises a thermoelectric refrigeration device.

8. The cooling device of claim 1, further comprising a base structure that houses the cold plate.

9. The cooling device of claim 8, further comprising a user interface in or on the base structure.

10. The cooling device of claim 9, wherein the user interface comprises indicators and controls for operating the cold plate.

11. The cooling device of claim 8, further comprising a fan within the base structure.

12. The cooling device of claim 11, further comprising at least one vent in the base structure to improve airflow through the base structure induced by the fan.

13. The cooling device of claim 8, further comprising support legs extending from a bottom of the base structure for supporting the cooling device on a tabletop.

14. A cooling device for cooling paraffin blocks, the cooling device comprising:
   a base structure;
   a cold plate in the base structure, the cold plate configured to maintain a predetermined surface temperature of between about-5 degrees Celsius and about 10 degrees Celsius;
   a fan within the base structure to facilitate cooling of the cold plate;
   a lid coupled to the base structure with at least one hinge, the lid shaped and sized to cover the cold plate and to define an enclosure between the lid and the cold plate when the lid is closed, the lid comprising a transparent window; and a perforated sheet of insulating polymer material positioned over a surface of the cold plate to be directly between any paraffin blocks to be cooled and the surface of the cooling plate.

15. The cooling device of claim 14, wherein the perforated sheet of insulating polymer material has a thickness of between about 0.1 mm and about 5 mm.

* * * * *